2 Sheets—Sheet 1.

E. S. PEROT & H. C. BEITENMAN,

E. O. BEITENMAN, administratrix of H. C. BEITENMAN, deceased; assignors to NATIONAL MANUFACTURING COMPANY.

CHUCK.

No. 10,102. Reissued May 2, 1882.

WITNESSES

E. J. Nottingham

Herman Moran.

INVENTOR

E. S. Perot.

Elizabeth O. Beitenman

By H. A. Symons. ATTORNEY

N. PETERS, Photo-Lithographer, Washington, D. C.

2 Sheets—Sheet 2.

E. S. PEROT & H. C. BEITENMAN,

E. O. BEITENMAN, administratrix of H. C. BEITENMAN, deceased; assignors to NATIONAL MANUFACTURING COMPANY.

CHUCK.

No. 10,102. Reissued May 2, 1882.

WITNESSES

Geo. W. Seymour
A. M. Bright

INVENTOR

E S Perot
Elizabeth O Beitenman
By H A Seymour Attorney

N. PETERS, Photo-Lithographer, Washington, D. C.

UNITED STATES PATENT OFFICE.

EDWARD S. PEROT AND ELIZABETH O. BEITENMAN, (ADMINISTRATRIX OF H. C. BEITENMAN, DECEASED,) OF PHILADELPHIA, PA., ASSIGNORS TO NATIONAL MANUFACTURING COMPANY, OF NEW HAVEN, CONN.

CHUCK.

SPECIFICATION forming part of Reissued Letters Patent No. 10,102, dated May 2, 1882.

Original No. 167,018, dated August 24, 1875. Application for reissue filed December 23, 1881.

*To all whom it may concern:*

Be it known that EDWARD S. PEROT and HARRY C. BEITENMAN, of the city and county of Philadelphia, Pennsylvania, have invented a new and Improved Chuck, of which the following is a specification.

This invention relates to an improvement in chucks, the object being to provide a chuck with devices for throwing an annular gear into and out of engagement with pinions attached to screw-shafts connected with the jaws, whereby the latter may be operated separately and independently or simultaneously, as desired.

With these ends in view the invention consists, first, in a shifting-ring provided with a stud or projection that extends through an elongated slot formed in the shell of the chuck; second, in the combination, with the shifting-ring and shell, the latter provided with an elongated opening, of a screw-threaded stud or shank secured to the ring and extending through the elongated opening in the shell, and a nut for securing the shifting-ring in any desired position; third, in the combination, with the shifting-ring, of a stop-lug constructed to cover the elongated opening in the shell of the chuck.

Figure 1:
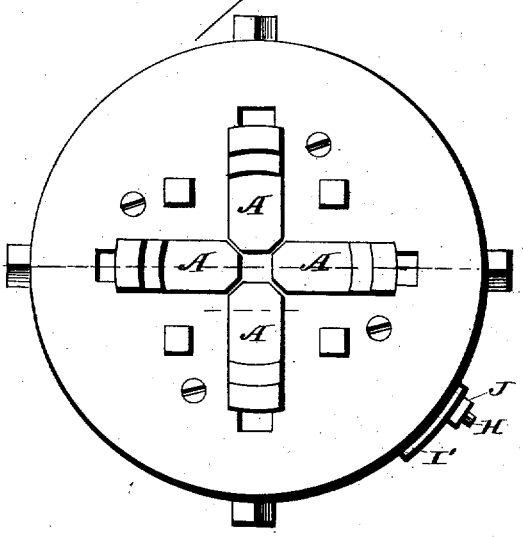
Figure 2:
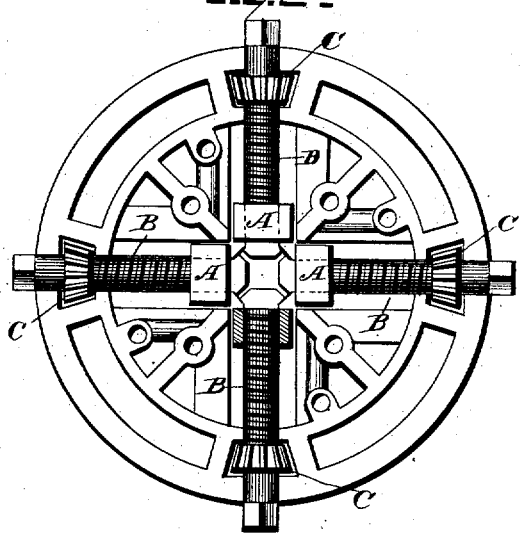
Figure 3:
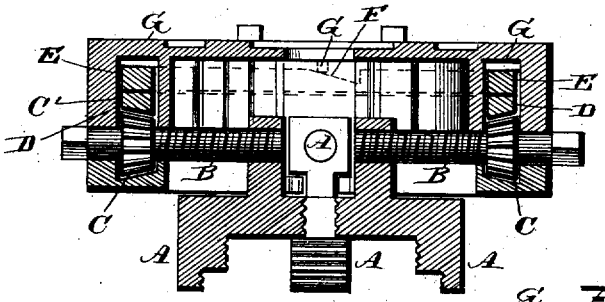
Figure 4:
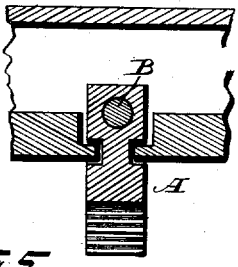
Figure 5:
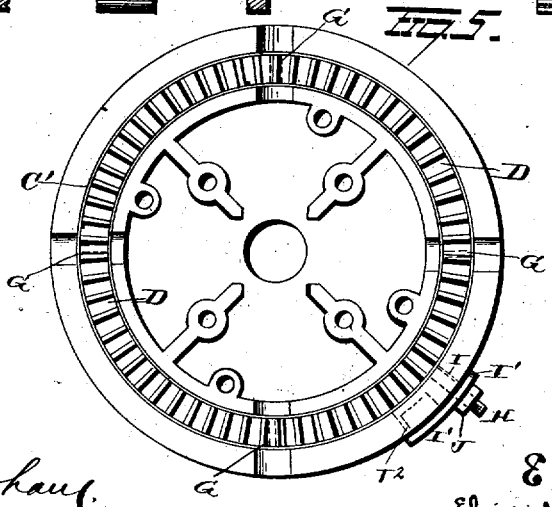
Figure 6:
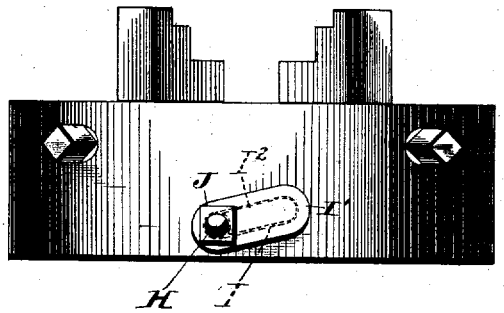
Figure 7:
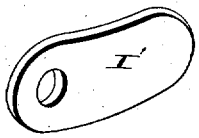
Figure 8:
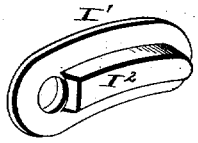

In the accompanying drawings, Figure 1 is a face view of the chuck. Fig. 2 is an elevation of the front plate and the jaws and screws. Fig. 3 is a section taken through the center of the chuck. Fig. 4 is a section of one of the screws and a jaw, and Fig. 5 is an elevation of the back plate and the wheel or annular gear for operating the jaws. Fig. 6 is a view of the chuck in side elevation, and Figs. 7 and 8 are views in perspective of the outer and inner faces of the plate I′.

A represents the jaws of the chuck, fitted to the front face of the chuck-casing, as shown in Figs. 3 and 4, and adapted to be radially adjusted therein.

B are the screws, the inner ends of which fit in screw-threaded openings in the jaws A, while their outer ends extend through openings formed in the shell of the chuck and are squared to enable them to be turned by a wrench in order that the jaws may be operated independently of each other. To the screws B are attached the pinions C.

Within an annular groove, C′, in the chuck-casing is located an annular gear, D, and a shifting-ring, E, the latter being placed beneath the annular gear. The shifting-ring E is constructed with inclines F, which ride up and down the studs G, formed in the bottom of the groove for the annular gear and shifting-ring.

To the shifting-ring E is secured a screw-threaded stud or shank, H, which extends outwardly through an elongated slot, I, formed in the shell of the chuck, said slot being inclined to correspond with the inclines F on the shifting-ring E, so that by shifting the stud or shank H to one end of the slot the shifting-ring E will force the annular gear D into gear with the pinions C, and shifting it in the opposite direction the shifting-ring will allow the annular gear to move back out of gear with the pinions, and thereby in the case first mentioned cause the jaws to operate simultaneously in the manner of a universal chuck and in the latter case to operate independently of each other.

I′ is a plate perforated at one end to receive the stud H, which projects out of the slot I and provided on its inner face with a stop-lug, $I^2$. When the ring E is raised by the engagement of its inclines F with the studs G, thereby meshing the annular gear D with the pinions C, it is locked in this adjustment by the insertion of the lug $I^2$ of the plate I′ into the slot I, said lug filling that portion of the slot not occupied by the stud H. The projecting end of the stud receives a nut, J, the latter, when screwed down to impingement with the plate I′, preventing the displacement of the parts. The said plate I′ covers the slot I and prevents the ingress of dirt or foreign substances to the working parts of the chuck.

Having fully described the invention, what is claimed as new, and desired to be secured by Letters Patent, is—

1. In a chuck, a shifting-ring provided with a stud that extends through an elongated slot formed in the periphery of the shell of the chuck and inclined thereto.

2. In a chuck, a shifting-ring provided with a stud which projects through a slot formed in the shell of the chuck and a plate perforated to receive said stud and provided on its inner face with a lug to fit within the slot.

3. In a chuck, a shifting-ring provided with a stud which projects through a slot formed in the shell of the chuck and a plate constructed to cover said slot, perforated to receive the said stud and provided on its inner face with a lug to fit within the slot.

4. The combination of the stop-lug $1^2$ with the stud H of the shifting-ring E and the slotted shell of the chuck.

In testimony whereof we have signed this specification in the presence of two subscribing witnesses.

EDWARD S. PEROT.
ELIZABETH O. BEITENMAN,

*Administratrix of Harry C. Beitenman, deceased.*

Witnesses:
J. R. MASSEY,
FRANK H. MASSEY.